Figure 1:
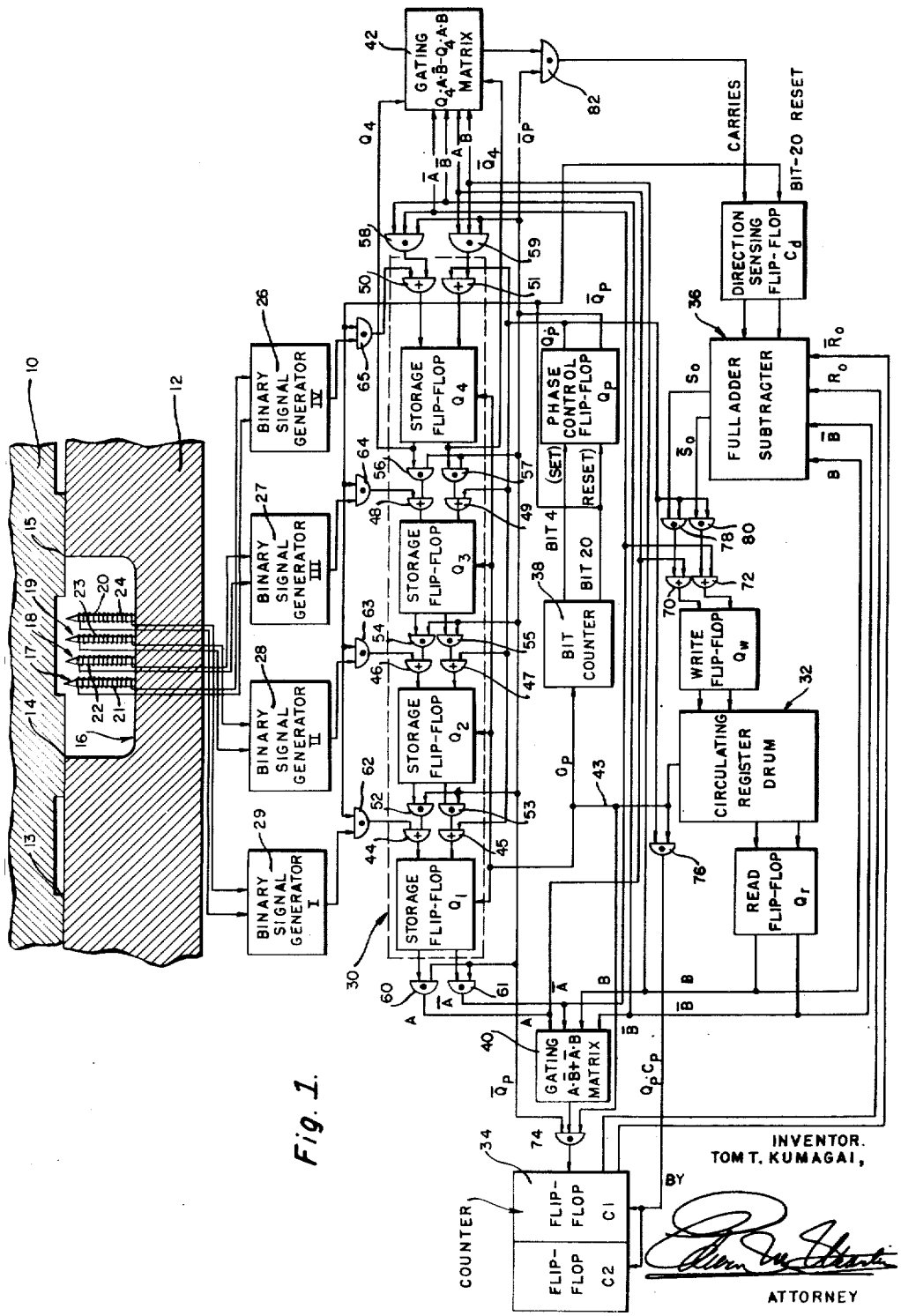

Oct. 8, 1957     T. T. KUMAGAI     2,808,650
DIRECTION SENSING AND DISPLACEMENT DETECTION APPARATUS
Filed Aug. 16, 1956     2 Sheets-Sheet 1

INVENTOR.
TOM T. KUMAGAI,
BY
ATTORNEY

United States Patent Office 2,808,650
Patented Oct. 8, 1957

2,808,650

DIRECTION SENSING AND DISPLACEMENT
DETECTION APPARATUS

Tom T. Kumagai, Los Angeles, Calif., assignor to Hughes Aircraft Company, Culver City, Calif., a corporation of Delaware Application August 16, 1956, Serial No. 604,466

6 Claims. (Cl. 33—125)

This invention relates to direct sensing and detection apparatus and more particularly to an apparatus responsive to periodic samples of the signals from two or more heads reading a linear scale, said apparatus being capable of sensing direction of movement along the scale and accurately determining the extent of the movement.

The device of the present invention is operative in response to binary signals derived from a plurality of reading heads adapted to read a linear scale. These reading heads are grouped along the scale within a distance, $\lambda/2$, equal to one-half periodicity or one-half "wavelength." The individual reading heads are spaced at intervals equal to $\lambda/2N$ along the scale, where N is the total number of reading heads. The operation of the device is divided into two phases of operation designated as the "serial shift" and "accumulator" phases. Just prior to the commencement of the serial shift phase, means including a storage-shifting register is provided to sample and store the binary signals from the N heads. For the purpose of explanation, the newly sampled signals are referred to as the "present" configuration and the samples from the prior position are referred to as the "last" configuration. In this respect, the maximum speed at which the heads traverse the scale must be limited to the extent that the present configuration of signals is never more than (N—1) positions away from the last configuration. A position is defined as the region throughout which the configuration of signals therefrom remains unchanged.

In addition to the above, the present device comprises an accumulator and apparatus for storing the last configuration of signals which apparatus may be provided by time-sharing a circulating register or drum. In accordance with the invention, during the serial shift phase of operation, means is provided to serially shift the present and last configurations of signals out of their respective storage devices and compare corresponding bits to determine the number of "disagreements" or "counts." A pulse corresponding to each of these counts is impressed on a counting device in order to determine the total number of counts or disagreements for each present and last configuration. The total number of counts represents the number of positions that the position corresponding to the present configuration is away from that corresponding to the last configuration.

It now remains to be determined whether to add or subtract this number of positions from the sum already in the accumulator. In accordance with the invention, a selected bit of the new configuration is employed as a control bit to determine whether to subtract a particular bit of the last configuration from its corresponding bit of the present configuration or vice versa, i. e., to subtract the corresponding bit of the present configuration from the particular bit of the last configuration. It is generally preferred to use the bit of the present configuration which would be the last to be serially shifted from the storage shifting register so as to avoid the use of an additional flip-flop as will be hereinafter explained. Further, it may be necessary to alter the control bit in a predetermined manner when there is a particular type of correspondence between any two bits being compared. This altering of the control bit is chosen so that one or more carries generated from the afore-mentioned subtractions indicate a movement in the opposite direction. Hence, the carries thus generated may be employed to determine whether to add or subtract the number of counts from the sum in the accumulator whereby the resulting sum is changed by the net movement of the reading heads along the linear scale. This addition or subtraction is accomplished during the accumulator phase of operation.

It is therefore an object of the present invention to provide an improved direction sensing and detection apparatus which requires a minimum of equipment and logic gating elements.

Another object of the present invention is to provide a direction sensing and detection apparatus responsive to signals from two or more reading heads thereby to provide a greater resolution of a given scale and permit the use of coarser scales.

Still another object of the present invention is to provide a direction sensing and detection apparatus capable of operating in response to signals from an increased number of reading heads without increasing the complexity of the logical gating.

A further object of the present invention is to provide a direction sensing and detection apparatus capable of operating in response to signals from more than two reading heads thereby enabling greater distances to be traversed between samplings whereby the maximum traverse speed along the controlled axis is increased.

Figure 2:
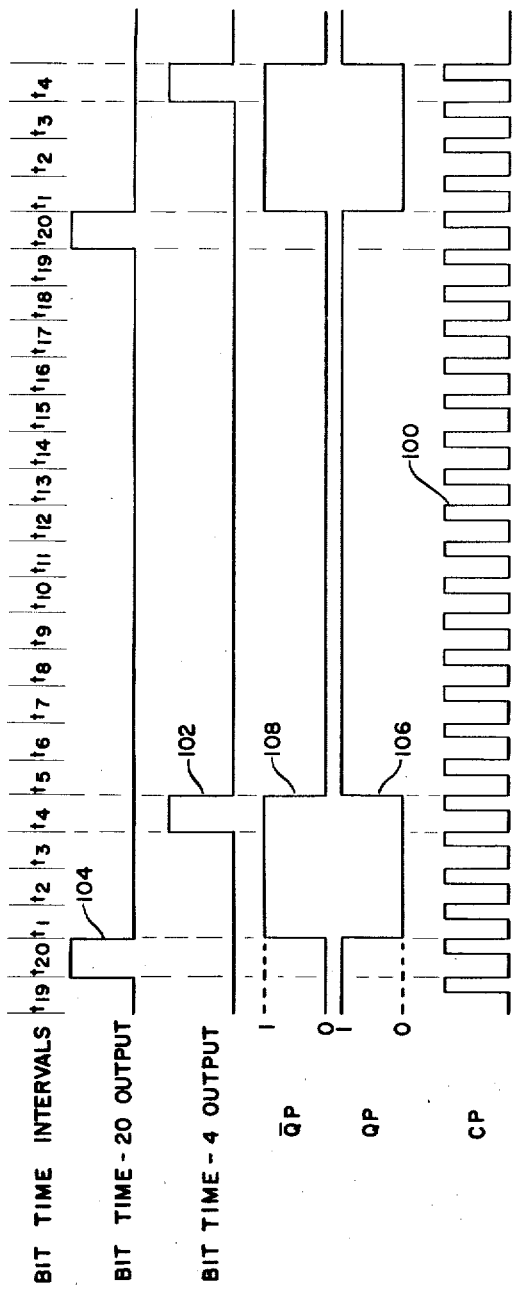

The above-mentioned and other features and objects of this invention and the manner of attaining them will become more apparent by reference to the following description taken in conjunction with the accompanying drawings, wherein:

Fig. 1 is a schematic block diagram of a preferred embodiment of the device of the present invention; and Fig. 2 illustrates several explanatory waveshapes at points throughout the device of Fig. 1.

Referring now to Fig. 1, there is shown a schematic block diagram of a preferred embodiment of the device of the present invention, which device is adapted to operate in response to binary signals derived from a plurality of reading heads. For the purposes of explanation, a device adapted to operate in conjunction with four reading heads is described. It is, however, clearly evident that any number of reading heads may be employed with only minor modifications. Further, although the present device, as shown, is adapted to operate in conjunction with magnetic reading heads, it is evident that optical or other equivalent systems may also be employed without departing from the spirit and scope of the invention.

Referring to the drawings, Fig. 1 shows a cross-sectional view of a portion of a magnetic scale 10 together with an associated movable magnetic element 12. Magnetic scale 10 includes a series of transverse lands, such as lands 13, 14 and 15 with intervening grooves, all of which are of equal width. Magnetic element 12 is adapted to slide along the lands and includes a recess 16 located on the side thereof immediately adjacent the magnetic scale 10 for housing the four reading heads 17, 18, 19 and 20. When four reading heads are employed, as in the present case, they are disposed at successive intervals equal to $$\frac{1}{2N} = \frac{1}{8}$$

cycle of the scale apart, N being the total number of reading heads. The width of one land and one groove is considered as one complete cycle along the magnetic scale 10. With regard to the reading heads 17–20, each comprises a magnetic core which is magnetically connected to the magnetic element 12 within the recess 16, each of which are tapered to a point in a direction transverse to the length of magnetic scale 10 and are of a length such that the points substantially touch the lands as the magnetic element 12 slides along the scale 10. About the magnetic cores of the reading heads 17–20 there are disposed coils 21, 22, 23 and 24, respectively. Because of the length that the magnetic element 12 extends along the magnetic scale 10, there is a very low reluctance path therebetween. Consequently, when the magnetic core of a particular reading head is over a land of the scale 10, the associated coil is threaded by a low reluctance path and, consequently, is more inductive than when the magnetic core is over a groove inasmuch as the air gap increases the reluctance of the path threading the coil. The terminals of the coils 21–24 of the reading heads 17–20 are coupled to binary signal generators 26, 27, 28, 29, respectively. The generators 26, 27, 28 and 29 are designed to derive a binary signal in accordance with the variations in inductance of the coils 21, 22, 23 and 24 in the manner disclosed in a copending application Serial No. 595,256, entitled Bridge Circuit for Position Measuring Device, filed July 2, 1956, by William T. Chater. The aforementioned copending application and the present application are assigned to a common assignee. Thus, the binary signals produced by the binary signal generators 26–29 are indicative of whether the magnetic core of a particular reading head is over a land or a groove. In accordance with convention, the binary signal produced when a particular reading head is over a land is designated as being at the "one" level and the signal produced in response to a reading head being over a groove is designated as being at the "zero" level. Employing this convention, the binary signals derived from the reading heads 17–20 by the binary signal generators 26–29, respectively, for successive positions $a$, $b$, $c$, $d$, $e$, $f$, $g$, $h$, $i$ (position of reading heads in drawing), $j$, $k$, $l$, $m$, $n$, $o$, $p$ and $q$ are tabulated in Table I as follows:

TABLE I

| Reading Head | Configurations of Binary Signals Taken at Successive Positions Along the Control Axis | | | | | | | | | | | | | | | | |
|---|---|---|---|---|---|---|---|---|---|---|---|---|---|---|---|---|---|
| 20 | 0 | 1 | 1 | 1 | 1 | 0 | 0 | 0 | 0 | 1 | 1 | 1 | 1 | 0 | 0 | 0 | 0 |
| 19 | 0 | 0 | 1 | 1 | 1 | 1 | 0 | 0 | 0 | 0 | 1 | 1 | 1 | 1 | 0 | 0 | 0 |
| 18 | 0 | 0 | 0 | 1 | 1 | 1 | 1 | 0 | 0 | 0 | 0 | 1 | 1 | 1 | 1 | 0 | 0 |
| 17 | 0 | 0 | 0 | 0 | 1 | 1 | 1 | 1 | 0 | 0 | 0 | 0 | 1 | 1 | 1 | 1 | 0 |
| | $a$ | $b$ | $c$ | $d$ | $e$ | $f$ | $g$ | $h$ | $i$ | $j$ | $k$ | $l$ | $m$ | $n$ | $o$ | $p$ | $q$ |

⟵ left       ↑ shown       right ⟶

In describing the apparatus of the present invention, a convention is employed wherein individual "and" and "or" gates are shown as semicircular blocks with the inputs applied to the straight side and the output appearing on the semicircular side. An "and" gate is indicated by a dot (.) and an "or" gate by a plus (+) in the semicircular block. As is generally known, an "and" gate produces a "one" or information level output signal only when every input is at the information level whereas an "or" gate produces an information level output signal when any one of the input signals thereto are at the information level.

Also, in addition to the above, a convention is employed in describing the particular embodiment of the present invention wherein the upper and lower inputs to the flip-flops, as they appear in the drawing, are designated as the "set" and "reset" inputs, respectively. An information level signal applied to either the set or reset inputs of a flip-flop will change its state in a manner such that an information level signal appears at the corresponding principal or complementary output terminals, respectively. Further, if information level signals are applied to both the set and reset inputs of a flip-flop, the state of the flip-flop will change in accordance with the last signal applied.

Referring to Fig. 1, the basic apparatus of the present invention comprises a storage-shifting register 30 which includes storage flip-flops Q1, Q2, Q3 and Q4; a circulating register 32 which may be of the drum type and which includes a write flip-flop, Qw, and a read flip-flop, Qr; a three-stage counting device 34 which includes flip-flops C1 and C2; and a full adder-subtractor 36 which may be of the type disclosed in Patent No. 2,803,401, entitled Arithmetic Units for Digital Computers issued to Eldred C. Nelson on August 20, 1957. The present device further includes a "bit" counter 38, a phase-control flip-flop, Qp, a direction-sensing flip-flop, Cd, and gating matrices 40 and 42.

The described apparatus is operated in a manner to "time share" the circulating register 32. In this respect, the circulating register 32 is adapted to store binary signals during a number of bit time intervals equal to the number of reading heads plus the number of bit time intervals necessary to accommodate a number capable of indicating the length of the magnetic scale employed in the system in terms of the smallest unit, e. g., mils. To this extent, if the lands and grooves are each one mil wide, 16 bit time intervals are adequate for a scale approximately 32 inches long. Thus, in the example shown, the circulating register 32 has 20 bit time intervals as shown graphically in Fig. 2. The circulating register 32 also produces a clock-pulse signal, Cp, which signal constitutes a positive voltage excursion at the end of each of the bit time intervals, as represented by the waveform 100, Fig. 2. These clock-pulse signals, Cp, are made available on lead 43 in the apparatus shown in Fig. 1 and are applied to each of the flip-flops Q1, Q2, Q3 and Q4 of the storage-shifting register 30 and to the bit counter 38.

The operation of the apparatus is divided into two phases; namely, the "serial shift" and "accumulator" phases. These phases are controlled by the principal and complementary outputs of phase control flip-flop Qp which, in turn, is set and reset by signals generated by the bit counter 38. The serial shift phase is concurrent with the bit time intervals $t_1$, $t_2$, $t_3$ and $t_4$ while the accumulator phase is concurrent with the remainder of the bit time intervals $t_5$–$t_{20}$. The phase control flip-flop Qp is set by a bit–4 signal and reset by a bit–20 signal, both of which are generated by the bit control 38 in response to clock pulse signals Cp from the circulating register 32. The bit counter 38 is simply a counter which produces an information level signal during the $t_4$ bit time interval, designated as the bit–4 signal, and a second information level signal during the $t_{20}$ bit time interval, designated as the bit–20 signal. The bit–4 and bit–20 signals have waveforms 102 and 104, as shown in Fig. 2. The bit–4 and bit–20 signals are employed to set or reset, respectively, the phase control flip-flop Qp whereby the principal output signal, Qp, therefrom is at the information level during bit time intervals $t_5$–$t_{20}$ inclusive, and 0 during the remaining time interval. The complementary output, $\overline{Qp}$, on the other hand, is at the information level during bit time intervals $t_1$–$t_4$, inclusive. Signals Qp and $\overline{Qp}$ have waveforms 106 and 108, respectively, as shown in Fig. 2.

The storage shifting register 30 is adapted to sample the configuration of binary signals produced at the output of binary signal generators 26–29 during bit time interval $t_{20}$. Subsequently, during the serial shift phase, these signals thus sampled are shifted serially out of the register through the storage flip-flop Q1. Also, at the termination of the serial shift phase, each of the storage flip-flops Q1–Q4 are reset to 0 by the $Qp$ signal. An apparatus for accomplishing the above may comprise "or" gates 44, 45; 46, 47; 48, 49; and 50, 51 having outputs connected to the set and reset inputs, respectively, of flip-flops Q1, Q2, Q3 and Q4. In addition, register 30 may include "and" gates 52, 53; 54, 55; 56, 57; and 58, 59, the outputs of which are connected to the inputs of the "or" gates 44, 45; 46, 47; 48, 49 and 50, 51, respectively. The principal and complementary outputs of the flip-flops Q2, Q3 and Q4 are connected, respectively, to the inputs of the "and" gates 52, 53; 54, 55; and 56, 57. The principal and complementary outputs from the flip-flop Q1, on the other hand, are connected, respectively, to the inputs of "and" gates 60, 61. A remaining input to each of the "and" gates 52, 53; 54, 55; 56, 57; and 60, 61 is connected to the complementary output of the phase control flip-flop, $Qp$, so that the signals stored in the flip-flops Q1–Q4 are serially shifted out through Q1 during the serial shift phase as determined by signal $\overline{Qp}$. The principal and complementary signals thus serially shifted out of the storage-shifting register 30 are designated as A and $\overline{A}$, respectively, and the bits of signal A are referred to as the "present configuration" of binary signals.

During operation, each of the flip-flops Q1, Q2, Q3 and Q4 is set during bit intervals $t_{20}$ so as to sample and store the binary signal presently being generated by the binary signal generators 29, 28, 27 and 26, respectively. This is accomplished by applying, respectively, the output of each of the binary signal generators 29, 28, 27, 26 together with the bit–20 signal to the inputs of "and" gates 62, 63, 64 and 65, the outputs of which are connected through "or" gates 44, 46, 48 and 50 to the respective set inputs of flip-flops Q1, Q2, Q3 and Q4. After the serial shift phase and at the commencement of the accumulator phase, the flip-flops Q1, Q2, Q3 and Q4 are rest to zero by the application of the $Qp$ signal from the phase control flip-flop $Qp$ through the "or" gates 45, 47, 49 and 51 to the rest inputs thereof, respectively.

The signals A and $\overline{A}$ thus serially shifted out of the storage-shifting register 30 are applied through "or" gates 70, 72 to the set and reset inputs of the write flip-flop $Qw$ of the circulating register 32 to store the signals A and $\overline{A}$ in the space on the drum corresponding to bit intervals $t_1$, $t_2$, $t_3$ and $t_4$. Simultaneously with the storing of the signals A and $\overline{A}$ in the circulating register 32, the principal and complementary signals corresponding to the previous or "last" configuration of binary signals stored during the previous serial shift phase in the space on the drum allocated to bit intervals $t_1$, $t_2$, $t_3$ and $t_4$ is read by the read flip-flop $Qr$. The principal and complementary signals thus read from the drum are designated as B and $\overline{B}$, respectively.

The binary signals A, $\overline{A}$, B, $\overline{B}$ are then applied to the gating matrix 40 which, in accordance with the present invention, is adapted to compare the corresponding bits of the present and last configurations of binary signals derived from the binary signal generators 26–29. As previously specified, the number of "disagreements" resulting from such comparison is equal to the number of positions that the position along the scale 10 corresponding to the present configuration is away from that corresponding to the last configuration. It is evident that whenever the signals A and $\overline{B}$ or the signals $\overline{A}$ and B are at the information level, there is such a disagreement between the corresponding bits of the present and last configurations. Thus, gating matrix 40 may comprise a first "and" gate responsive to the signals A and $\overline{B}$ and a second "and" gate responsive to the signals $\overline{A}$ and B. The outputs from these first and second "and" gates are applied to an "or" gate, the output from which constitutes the output from the gating matrix 40. In order to count the number of disagreements, it is desirable to produce a pulse for each such disagreement during the serial shifting phase. This is accomplished by applying the complementary phase control signal $\overline{Qp}$ from the complementary output of the phase control flip-flop $Qp$ together with the clock pulse signal $Cp$ from the circulating register 32 and the output from the gating matrix 40 to an "and" gate 74 whereby a clock pulse appears at its output for every disagreement during the serial shift phase. The output from the "and" gate 74 is applied to the counting device 34 which device is adapted to count the total number of disagreements during any one serial shift phase interval. In the present case where only four reading heads 17–20 are employed, it is only necessary that the counting device 34 have three stages, i. e., the counting device 34 should be capable of recording a two-digit binary number.

During the accumulator phase of operation, it is desired to add or subtract the numbers of counts recorded by the counting device 34 to the number previously stored in the space corresponding to bit intervals $t_5$–$t_{20}$ in the circulating register 32. The principal and complementary signals read from the circulating register 32 by the read flip-flop $Qr$ during the accumulator phase of operation is still designated as B and $\overline{B}$. The signals B and $\overline{B}$, however, now, represent the sum or difference previously recorded in positions on the drum corresponding to the bit intervals $t_5$–$t_{20}$. This sum or difference will normally represent the total movement of the magnetic element 12 along the magnetic scale 10. In order to accomplish this addition or subtraction during the accumulator phase, the $Qp$ signal from the pulse phase control flip-flop $Op$ together with the clock pulses from the circulating register 32 are applied to an "and" gate 76, the output from which is, in turn, applied to the flip-flops C1 and C2 of the counting device 34 to serially shift any number stored therein out at the commencement of the accumulator phase of operation. The principal and complementary signals thus shifted out of the counting device 34 are designated as $Ro$ and $\overline{Ro}$, respectively. The principal and complementary signals B and $\overline{B}$ from the circulating register 32 and the signals $Ro$ and $\overline{Ro}$ from the counter 34 are applied to the full adder-subtracter 36 to produce a resulting sum or difference. The principal and complementary signals representing this sum or difference are designated as $So$ and $\overline{So}$, respectively. The signals $So$ and $\overline{So}$, respectively, are applied to "and" gates 78 and 80 along with the signal $Qp$ provided by the phase control flip-flop $Qp$. The outputs from the "and" gates 78 and 80 are then applied through the "or" gates 70, 72, respectively, to the set and reset inputs of the write flip-flop $Qw$, thereby to record and store the signals $So$ and $\overline{So}$.

It is necessary to provide an instruction to the full adder-subtracter 36 so that the number represented by the signal $Ro$ may be properly added or subtracted from the number represented by the signal B during the accumulator phase in accordance with direction of movement of the magnetic head 12 along the scale 10. This instruction is provided in the form of the principal and complementaary outputs of the direction sensing flip-flop $Cd$, the state of which is determined during the serial shift phase of operation in a manner hereinafter explained. The bit–20 signal is applied to the reset input of the direction sensing flip-flop $Cd$ so that its principal output corresponds to zero level at the commencement of the serial shift phase of operation. When the principal output of the flip-flop $Cd$ is at the zero level, the full adder-subtracter 36 is instructed to add the number represented by signal $Ro$ to the number represented by signal B. Alternatively, when the principal output of the flip-flop $Cd$ is at the information level, the full adder-subtracter 36 is instructed to subtract the number represented by signal $Ro$ from the number represented by signal B.

In formulating the afore-mentioned instructions to the full adder-subtracter 36, the principal output from the storage flip-flop Q4 of the storage-shifting register 30 is employed as a control bit to determine the ultimate state of the direction-sensing flip-flop Cd. In that this control bit is the last to be shifted from the register 30, the storage flip-flop Q4 may be employed directly to store it and to record subsequent changes. However, it is obviously within the teachings and scope of the present invention to use an additional flip-flop, in which case any one of the bits of a sample configuration may be employed as the control bit.

In the present case, the individual bits of the present and last configurations are subtracted from each other in a direction determined by the control bit whereby the production of one or more carries is indicative of a movement in the negative direction and the production of zero carries is indicative of either a zero or positive movement. The afore-mentioned differences are taken in accordance with the following rules for each pair of corresponding bits of the last and present configurations. When the control bit is one, i. e., when the principal output of the storage flip-flop Q4 is at the information level, the bit of the last configuration is subtracted from that of the present configuration. On the other hand, when the control bit is zero, i. e., when the complementary output of the storage flip-flop Q4 is at the information level, the bit of the present configuration is subtracted from that of the last configuration. In addition to the above, when the two bits of the present and last configurations being compared are 1, the control bit is made to be 0. Further, when the two bits of the present and last configurations are 0, the control bit is made to be 1. The carry signals referred to above are generated by applying the principal and complementary signals Q4, $\overline{Q4}$, A, $\overline{A}$ and B, $\overline{B}$ to gating matrix 42. The gating matrix 42 may include, for example, a first "and" gate responsive to the signals Q4, A and $\overline{B}$ and a second "and" gate responsive to the signals $\overline{Q4}$, $\overline{A}$ and B. The outputs from these first and second "and" gates are then applied to an "or" gate, the output from which constitutes the output of the matrix 42. As it is desired to generate carries only during the serial-shift phase, the output from the matrix 42 is applied together with the serial shift phase signal $\overline{Qp}$ to an "and" gate 82, the output from which is connected to the set input of the direction sensing flip-flop Cd.

In accordance with the convention employed, a control bit of 1 corresponds to the principal output of the storage flip-flop Q4 being at the information level. As previously indicated, if the two bits being compared are 1, it is desired that the control bit be made 0. Also, if the two bits being compared are 0, it is desired that the control bit be made 1. These changes are of course, only made during the serial-shift phase of operation. The above functions may be accomplished by applying the binary signals $\overline{A}$, $\overline{B}$ and Qp to the "and" gate 58, the output of which is applied through the "or" gate 50 to the "set" input of the storage flip-flop Q4. In addition, the binary signals A, B and Qp are applied to the inputs of the "and" gate 59, the output of which is applied through the "or" gate 51 to the reset input of the storage flip-flop Q4.

In order to illustrate the truth of the aforementioned logic incorporated in the described embodiment of the present invention, the following Tables II–IX are presented which cover all possible combinations for the present case wherein the four leading heads 17—20 are employed. In each of the following Tables II–IX, a particular "last" configuration of binary signals for one of the eight positions of a complete cycle along the scale 10 appears in the left column as illustrated. The particular position is identified by the lower case letter employed to identify the corresponding position in Table I. In each of the Tables II–IX, the seven possible "present" configurations appear in the columns to the right and are identified by the proper lower case letter as per Table I with the number of positions away from the last configuration indicated in parenthesis. In this respect, a movement to the left is regarded as negative and a movement to the right as positive.

The direction of the afore-mentioned subtraction as would be instructed by the action bit is then, in each case, indicated by an arrow. An arrow pointing to the right indicates that the bit of the last configuration is to be subtracted from the corresponding bit of the present configuration whereas an arrow pointing to the left indicates that the bit of the present configuration is to be subtracted from the bit of the last configuration.

Further, below each column of present configurations, there appears a number labeled "Counts" which is the number of "disagreements" between the bits of the present and last configurations. As previously explained, the counts are representative of the distance moved between samplings. The speed along the scale 10 is controlled so that a present configuration is never more than 3 counts or positions away from the position corresponding to the last configuration.

In the next column below "Counts" there appears a horizontal column labeled "Carries" which is the number of carries generated when the substractions are taken in the directions indicated by the arrows. The generation of one or more carries indicates that the displacement has been in a negative direction whereas no carries indicates that the displacement has either been zero or in a positive direction. Thus, in the horizontal column labeled "Direction," directions to the right or left in accordance with the carries generated is indicated by plus or minus signs, respectively.

TABLE II

| Last Configuration | Present Configurations | | | | | | |
|---|---|---|---|---|---|---|---|
| f | c(−3) | d(−2) | e(−1) | f(0) | g(+1) | h(+2) | i(+3) |
| 0 | 1 → | 1 → | 1← | 0← | 0← | 0← | 0← |
| 1 | 1 → | 1 → | 1 → | 1 → | 0← | 0← | 0← |
| 1 | 0 → | 1 → | 1 → | 1 → | 1 → | 0 → | 0← |
| 1 | 0 → | 0 → | 1 → | 1 → | 1 → | 1 → | 0← |
| Counts | 3 | 2 | 1 | 0 | 1 | 2 | 3 |
| Carries | 2 | 1 | 1 | 0 | 0 | 0 | 0 |
| Direction | − | − | − | + | + | + | + |

TABLE III

| Last Configuration | Present Configurations | | | | | | |
|---|---|---|---|---|---|---|---|
| g | d(−3) | e(−2) | f(−1) | g(0) | h(+1) | i(+2) | j(+3) |
| 0 | 1 → | 1← | 0← | 0← | 0← | 0← | 1 → |
| 0 | 1 → | 1← | 1← | 0← | 0← | 0← | 0← |
| 1 | 1 → | 1 → | 1 → | 1 — | 0 → | 0← | 0← |
| 1 | 0 → | 1 → | 1 → | 1 — | 1 → | 0← | 0← |
| Counts | 3 | 2 | 1 | 0 | 1 | 2 | 3 |
| Carries | 1 | 2 | 1 | 0 | 0 | 0 | 0 |
| Direction | − | − | − | + | + | + | + |

TABLE IV

| Last Configuration | Present Configurations | | | | | | |
|---|---|---|---|---|---|---|---|
| h | e(−3) | f(−2) | g(−1) | h(0) | i(+1) | j(+2) | k(+3) |
| 0 | 1← | 0← | 0← | 0← | 0← | 1 → | 1 → |
| 0 | 1← | 1← | 0← | 0← | 0← | 0← | 1 → |
| 0 | 1 → | 1← | 1← | 0← | 0← | 0← | 0← |
| 1 | 1 → | 1 → | 1 → | 1 → | 0← | 0← | 0← |
| Counts | 3 | 2 | 1 | 0 | 1 | 2 | 3 |
| Carries | 3 | 2 | 1 | 0 | 0 | 0 | 0 |
| Direction | − | − | − | + | + | + | + |

TABLE V

| Last Configuration | Present Configurations | | | | | | |
|---|---|---|---|---|---|---|---|
| $i$ | $f(-3)$ | $g(-2)$ | $h(-1)$ | $i(0)$ | $j(+1)$ | $k(+2)$ | $l(+3)$ |
| 0 | 0← | 0← | 0← | 0← | 1 → | 1 → | 1 → |
| 0 | 1← | 0← | 0← | 0← | 0← | 1 → | 1 → |
| 0 | 1← | 1← | 0← | 0← | 0← | 0← | 1← |
| 0 | 1← | 1← | 1← | 0← | 0← | 0← | 0← |
| Counts | 2 | 2 | 1 | 0 | 1 | 2 | 3 |
| Carries | 2 | 2 | 1 | 0 | 0 | 0 | 0 |
| Direction | − | − | − | + | + | + | + |

TABLE VI

| Last Configuration | Present Configurations | | | | | | |
|---|---|---|---|---|---|---|---|
| $j$ | $g(-3)$ | $h(-2)$ | $i(-1)$ | $j(0)$ | $k(+1)$ | $l(+2)$ | $m(+3)$ |
| 1 | 0← | 0← | 0 → | 1 → | 1 → | 1 → | 1 → |
| 0 | 0← | 0← | 0← | 0← | 1 → | 1 → | 1 → |
| 0 | 1← | 0← | 0← | 0← | 0← | 1← | 1 → |
| 0 | 1← | 1← | 0← | 0← | 0← | 0← | 1 → |
| Counts | 3 | 2 | 1 | 0 | 1 | 2 | 3 |
| Carries | 2 | 1 | 1 | 0 | 0 | 0 | 0 |
| Direction | − | − | − | + | + | + | + |

TABLE VII

| Last Configuration | Present Configurations | | | | | | |
|---|---|---|---|---|---|---|---|
| $k$ | $h(-3)$ | $i(-2)$ | $j(-1)$ | $k(0)$ | $l(+1)$ | $m(+2)$ | $n(+3)$ |
| 1 | 0← | 0 → | 1← | 1 → | 1 → | 1 → | 0 → |
| 1 | 0← | 0 → | 0 → | 1 → | 1 → | 1 → | 1 → |
| 0 | 0← | 0← | 0 → | 0← | 1← | 1 → | 1 → |
| 0 | 1← | 0← | 0 → | 0← | 0← | 1← | 1 → |
| Counts | 3 | 2 | 1 | 0 | 1 | 2 | 3 |
| Carries | 1 | 2 | 1 | 0 | 0 | 0 | 0 |
| Direction | − | − | − | + | + | + | + |

TABLE VIII

| Last Configuration | Present Configurations | | | | | | |
|---|---|---|---|---|---|---|---|
| $l$ | $i(-3)$ | $j(-2)$ | $k(-1)$ | $l(0)$ | $m(+1)$ | $n(+2)$ | $o(+3)$ |
| 1 | 0 → | 1 → | 1 → | 1 → | 1 → | 0← | 0← |
| 1 | 0 → | 0 → | 1 → | 1 → | 1 → | 1 → | 0← |
| 1 | 0 → | 0 → | 0 → | 1 → | 1 → | 1 → | 1 → |
| 0 | 0← | 0← | 0← | 0← | 1 → | 1 → | 1 → |
| Counts | 3 | 2 | 1 | 0 | 1 | 2 | 3 |
| Carries | 3 | 2 | 1 | 0 | 0 | 0 | 0 |
| Direction | − | − | − | + | + | + | + |

TABLE IX

| Last Configuration | Present Configurations | | | | | | |
|---|---|---|---|---|---|---|---|
| $m$ | $j(-3)$ | $k(-2)$ | $l(-1)$ | $m(0)$ | $n(+1)$ | $o(+2)$ | $p(+3)$ |
| 1 | 1 → | 1 → | 1 → | 1 → | 0← | 0← | 0← |
| 1 | 0 → | 1 → | 1 → | 1 → | 1 → | 0← | 0← |
| 1 | 0 → | 0 → | 1 → | 1 → | 1 → | 1 → | 0 → |
| 1 | 0 → | 0 → | 0 → | 1 → | 1 → | 1 → | 1 → |
| Counts | 3 | 2 | 1 | 0 | 1 | 2 | 3 |
| Carries | 3 | 2 | 1 | 0 | 0 | 0 | 0 |
| Direction | − | − | − | + | + | + | + |

Following is an example of the derivation of some of the figures in the Table II, above:

| Configurations | | Counts (Disagreements) | Control Bit | | Direction of Subtraction | Carries |
|---|---|---|---|---|---|---|
| Last | Present | | Initial | Final | | |
| $f$ | $e(-1)$ | | | | | |
| 0 | 1 | 1 | 1 | 1 | ← | 1 |
| 1 | 1 | 0 | 1 | 0 | → | 0 |
| 1 | 1 | 0 | 0 | 0 | → | 0 |
| 1 | 1 | 0 | 0 | 0 | → | 0 |
| Total 1 | | | | | Total 1 | |

As can be seen, there is one disagreement or count, indicating a movement of one position, and one carry indicating that the movement was in a negative direction.

What is claimed is:

1. A direction sensing and detection apparatus adapted to operate in response to binary signals derived from N reading heads wherein N is an integer equal to or greater than two, said N reading heads being disposed along a linear scale at successive intervals equal to $\lambda/2N$, wherein $\lambda$ is the distance of one complete cycle along the scale, said direction sensing and detection apparatus comprising a first register for storing samples of a last configuration of the binary signals from said N reading heads, means including a second register for sampling and storing samples of a present configuration of binary signals from said N reading heads, means for effecting said sampling at sufficiently short periodic intervals of time to make said present configurations always correspond to a position no more than (N−1) positions away from that of said last configuration, and means for determining and counting the number of disagreements in the levels of the corresponding bits of said samples of said last and new configurations of signals, the number of said disagreements being equal to the number of positions along said scale that the position corresponding to said present configuration of signals is away from the position corresponding to said last configuration of signals.

2. The direction sensing and detection apparatus as defined in claim 1 including a bistable device, means for subtracting or adding said number of disagreements to a prior sum in accordance with the state of said bistable device, means for generating carry signals from the differences between corresponding individual bits of said last and present configurations of signals to control the state of said bistable device, the direction of each of said differences being initially determined by a predetermined one of the bits of said present configuration, and means for subsequently altering the direction of said differences in response to a signal derived from a comparison of the respective bits of said last and present configurations of signals.

3. A direction sensing and detection apparatus adapted to operate in response to binary signals derived from N reading heads wherein N is an integer equal to or greater than two, said N reading heads being disposed along a linear scale at successive intervals equal to $\lambda/2N$, wherein $\lambda$ is the distance of one complete cycle along the scale, said direction sensing and detection apparatus comprising a first register for storing samples of a last configuration of the binary signals from said N reading heads, means including a second register for sampling and storing samples of a present configuration of binary signals from said N reading heads, means for effecting said sampling at sufficiently short periodic intervals of time to make said last and present configurations always correspond to positions no more than (N−1) positions apart, means for simultaneously serially shifting said last and present configurations of binary signals from said first and second storage registers, respectively, said first storage register providing first and second binary signals and said second storage register providing third and fourth binary signals, said second and fourth binary signals being complementary to said first and third binary signals, respectively, a first "and" gate responsive to said first and fourth binary signals, a second "and" gate responsive to said second and third binary signals, an "or" gate responsive to the output signals from said first and second "and" gates, and a counter circuit responsive to the output from said "or" gate, the number recorded in said counter after said last and present configurations of binary signals have been completely shifted out of said first and second registers being equal to the number of positions along said scale between the positions corresponding to said last and present configurations of signals.

4. The direction sensing and displacement detection apparatus as defined in claim 3 wherein said first register includes N flip-flops for storing the N bits of said present configuration of binary signals, the Nth flip-flop initially storing the last bit of said present configuration to be shifted from said first register, means coupled to said Nth flip-flop for providing 5th and 6th binary signals representative of the states of the said Nth flip-flop, said 6th binary signal being complementary to said 5th binary signal, a third "and" gate responsive to said second and fourth binary signals for producing an output signal adapted to set said Nth flip-flop, a fourth "and" gate responsive to said first and third binary signals for producing an output signal adapted to reset said Nth flip-flop, a fifth "and" gate responsive to said first, fourth and fifth binary signals, a sixth "and" gate responsive to said second, third and sixth binary signals, an "or" gate responsive to the output signals from said fifth and sixth "and" gates for generating a carry signal, and means responsive to said carry signal for producing a direction sensing signal indicative of the direction of movement from the position corresponding to said last configuration to the position corresponding to said present configuration.

5. The direction sensing and displacement detection apparatus as defined in claim 4 which additionally includes an accumulator, means for serially shifting the number stored by said counter out of said counter into said accumulator subsequent to said last and present configurations being completely shifted out of said first and second registers, respectively, and means responsive to said direction sensing signal for controlling whether to add or subtract the number being shifted out of said counter from the number initially stored in said accumulator whereby the resulting number therein is changed by an amount representative of the net movement of said reading heads along said scale.

6. A direction sensing and displacement detection apparatus for operating in response to binary signals derived from N reading heads adapted to read a linear scale wherein N is a positive integer equal to or greater than two, said N reading heads being disposed at successive intervals of $\lambda/2N$ along said scale, $\lambda$ being the distance of one complete cycle therealong, said direction sensing and displacement detection apparatus comprising a first storage register including at least N flip-flops; a circulating register for providing a circulating storage facility for a predetermined number greater than N bit time intervals and for producing a clock-pulse signal at the end of each of said bit time intervals; a bit counter responsive to said clock-pulse signals for producing a bit-N pulse signal during the Nth bit time interval and for producing a bit-total pulse signal during the last bit time interval; means responsive to said bit-total pulse signal for sampling and storing the present configuration of the binary signals derived from said N reading heads in the N respective flip-flops of said first register; a phase control flip-flop responsive to said bit-N and bit-total pulse signals for producing a phase control signal having a first portion and a remaining portion, said first portion being concurrent with the first N bit time intervals and said remaining portion being concurrent with the remaining bit time intervals; means responsive to said phase control signal for serially shifting the present configuration of binary signals out of said first register and into the first N bit time positions of said circulating register wherein said configuration is designated as the last configuration; means responsive to said phase control signal for serially shifting said present and last configurations of binary signals from said first and circulating registers, respectively, during the next succeeding first N bit time intervals, said first register providing first and second binary signals and said circulating register providing third and fourth binary signals, said second and fourth binary signals being complementary to said first and third binary signals, respectively; a first "and" gate responsive to said first and fourth binary signals; a second "and" gate responsive to said second and third binary signals; an "or" gate responsive to the output signals from said first and second "and" gates; and a counting device coupled to the output of said "or" gate whereby the number in said counter at the commencement of said remaining bit time intervals is equal to the number of positions between the positions corresponding to the present and last configurations of binary signals.

References Cited in the file of this patent
UNITED STATES PATENTS

| 2,462,292 | Snyder | Feb. 22, 1949 |
| 2,604,004 | Root | July 22, 1952 |
| 2,628,539 | de Neergaard | Feb. 17, 1953 |
| 2,672,393 | Cooper | Mar. 16, 1954 |
| 2,784,911 | Cooper | Mar. 12, 1957 |

UNITED STATES PATENT OFFICE
Certificate of Correction

Patent No. 2,808,650

Tom T. Kumagai

October 8, 1957

It is hereby certified that error appears in the printed specification of the above numbered patent requiring correction and that the said Letters Patent should read as corrected below.

Column 5, lines 37 and 39, for "rest" read —reset—, in each occurrence; column 6, line 18, for "numbers" read —number—; line 31, after "the" strike out "pulse"; same line 31, for "$Op$" read —$Qp$—; line 61, for "complementaary" read —complementary—; column 7, lines 23 and 28, for "last" read —present—; lines 24 and 27, for "present" read —last—; line 56, for "$Qp$" read —$\overline{Q}p$—; column 8, line 7, for "action" read —control—; same column 8, Table III, under the heading "$g(0)$", third and fourth items, for "1 —" read —1 → —, in each occurrence; column 9, Table V, under the heading, "$f(-3)$", fifth and sixth items, for "2" read —3—, in each occurrence; same column 9, Table VIII, under the heading "Last Configuration," fourth item, for "0", read —1—; column 11, line 23, after "of" strike out "the".

Signed and sealed this 15th day of April 1958.

[SEAL]

Attest:
KARL H. AXLINE,
*Attesting Officer.*

ROBERT C. WATSON,
*Commissioner of Patents.*